United States Patent Office 3,537,113
Patented Nov. 3, 1970

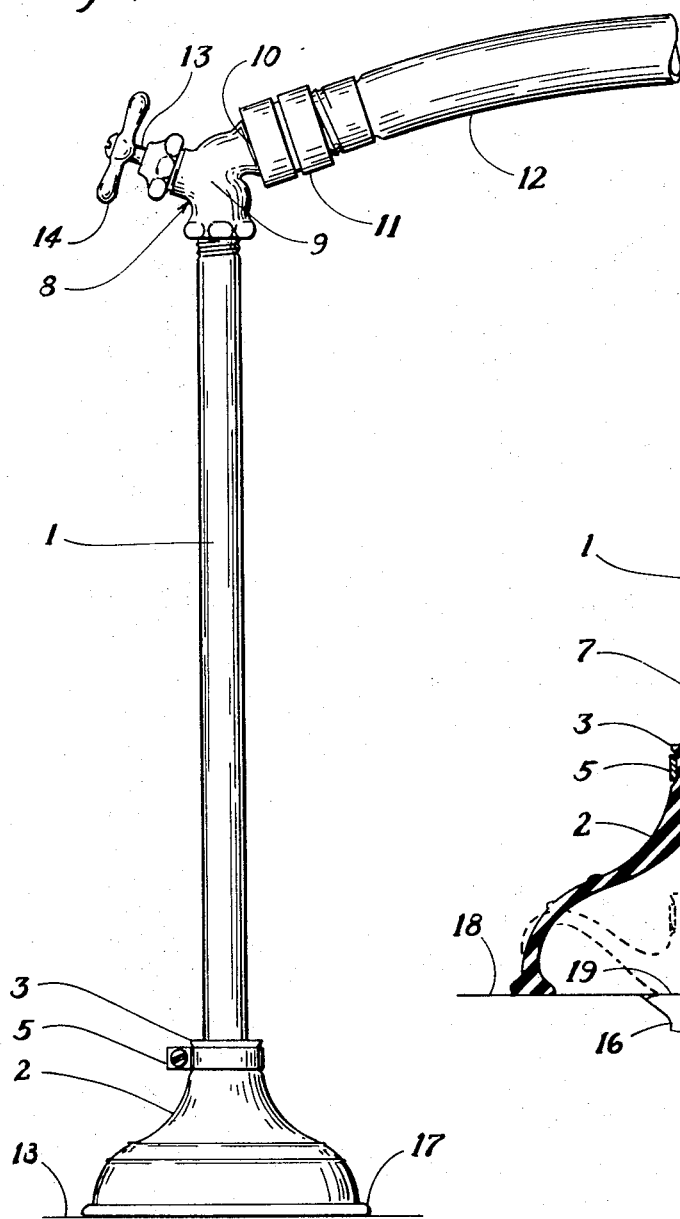
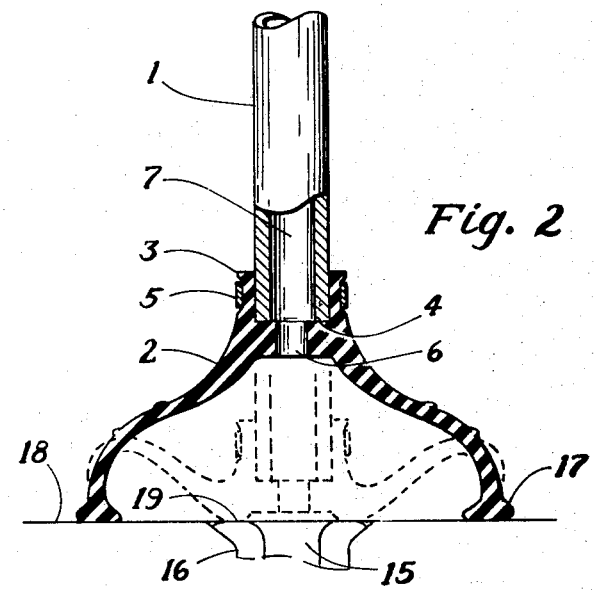

3,537,113
DRAIN-CLEANING DEVICE
Woodrow M. Elzner, 130 Hackberry Ave.,
Modesto, Calif. 95354
Filed Sept. 23, 1968, Ser. No. 761,575
Int. Cl. B08b 9/02
U.S. Cl. 4—256                    1 Claim

ABSTRACT OF THE DISCLOSURE

A device, for cleaning a clogged or sluggish-running domestic drain, comprising an inverted flexible and resilient cup adapted to embrace the drain opening in a sink or the like, a rigid vertically elongated tubular handle secured to and upstanding centrally from the cup, the latter having a passage therein establishing communication between the bore of the tubular handle and the interior of the cup, and a manually operative shut-off valve mounted on the upper end of the tubular handle and adapted for coupling to a flexible garden-type water hose.

SUMMARY OF THE INVENTION

The present invention provides, as a major object, a device, for cleaning a clogged or sluggish-running domestic drain, which is an improvement over the well-known appliance termed "a plumber's friend," and which includes an inverted flexible and resilient cup, and a handle secured to and upstanding centrally from the cup; the device in the present embodiment incorporating a rigid tubular handle which communicates at its lower end with the interior of the cup, and which tubular handle is fitted at its upper end with a manually operative shut-off valve adapted for coupling to a flexible garden-type water hose. With the valve open, water under pressure flows from the hose, through the handle, and into the cup to aid in cleaning of a drain in the manner hereinafter described.

The present invention provides a drain cleaning device which is easy and convenient for one person to manipulate; the valve, as mounted atop the tubular handle, being in a position for ready manual access for opening or closing of said valve, and the latter also serving as a hand grip by means of which vertical force or motion may be applied to the device as a whole.

The present invention provides, as a further object, a drain cleaning device which is designed for ease and economy of manufacture.

The present invention provides, as a still further object, a practical, reliable, and durable drain cleaning device and one which is exceedingly effective for the purpose for which it is designed.

BRIEF DESCRIPTION OF THE DRAWINGS

FIG. 1 is a side elevation of the drain-cleaning device as connected to a flexible garden-type water hose.

FIG. 2 is a fragmentary elevation, mainly in section, showing the inverted flexible and resilient cup, and the lower portion of the tubular handle as connected thereto; the view also illustrating, in broken lines, the cup as doubled down, and which occurs in one manner of use of the device.

DESCRIPTION OF THE PREFERRED EMBODIMENT

Referring now more particularly to the drawings and to the characters of reference marked thereon, the improved drain-cleaning device of the present invention comprises a rigid vertically elongated tubular handle 1 fitted at its lower end with an inverted force cup 2 of heavy-duty flexible and resilient material such as rubber.

The cup 2 includes a relatively short upstanding neck 3 which receives the lower end portion of the handle 1 with a relatively close fit; the handle 1, when engaged in the neck 3, bottoming against an annular seat 4. To assure against accidental escape of the handle 1 from the neck 3, suitable securing means is employed, and which is here shown as a clamp 5 which encircles said neck 3.

At the top and centrally thereof, the cup 2 includes a vertical, water-flow passage 6 which extends from the interior of the cup upwardly through the seat 4 and into communication with the bore 7 of handle 1. As shown, the water-flow passage 6 is of lesser inside diameter than that of the bore 7; this for a specific purpose as will later appear.

At the upper end thereof, the tubular handle 1 is fitted with a faucet-type shut-off valve indicated generally at 8; such valve including a main body 9 and a threaded laterally extending neck 10 provided with a swivel coupling 11 by means of which a flexible garden-type water hose 12 is connected ot said valve 8.

The valve 8—in opposition to the laterally extending neck 10—is provided with a laterally extending valve control stem 13 fitted on its outer end with a cross handle 14.

With the flexible garden-type water hose 12 connected at the female end to a water-supply faucet (not shown), and with such hose connected at its male end by the swivel coupling 11 to the valve 8 (which valve is initially closed), the described device is ready for use.

The device can be used, selectively, in severay ways. In one type of use, the inverted flexible and resilient cup 2 is placed centrally over the drain opening 15 of the drainpipe 16 to be cleaned; a peripheral bead 17 of the cup then bearing against the bottom 18 of the sink, or the like, from which the drainpipe 16 leads.

With the cup 2 so positioned, the handle 1 is pushed forcefully downwardly causing said cup to double-down intermediate the bead 17 and the water-flow passage 6 whereby to form an annular seal 19 which bears tightly on the upper end of the drainpipe 16 (or the fitting thereon).

Nextly, and with the cup held in such doubled-down position, the valve 8 is opened whereupon water under pressure flows from hose 12 through said valve downwardly in the handle 1, and thence through the water-flow passage 6. As such water-flow passage 6 is of reduced inside diameter relative to the bore 7 of handle 1, the velocity of the water flowing through passage 6 is substantially increased, and what may be termed "a jet action" is produced. From the passage 6, the water with such jet action discharges forcefully downwardly through thed rain opening 15 and into the drainpipe 16. In many instances this is sufficient to relieve the clogging or sluggish flow in the drainpipe.

However, in those instances where the desired result is not attained by use of the device in the manner described above, the handle 1—with the water remaining turned on—is reciprocated up and down whereby the resultant recurrent doubling-down of the cup 2 produces a supplemental pressure on the water in the cup and hence in the drainpipe 16. By virtue of the fact that the threaded neck 10 extends laterally from the valve body 9, the hose 12—due to its flexibility—does not materially impede up and down manual reciprocation of the handle 1 as above described.

Lastly, in an instance where a water hose 12 may not be available, or use of water is not indicated, the device is employed in the same manner as a conventional "plumber's friend," and in which event the valve 8 is, of course, closed.

By virtue of the use of valve 8 having a neck 10 extending laterally in one direction and valve stem 13 extending laterally in an opposite direction, such elements—together with the body 9—provide a most excellent hand grip whereby the handle 1 of the device can be forcefully vertically manipulated.

From the foregoing description, it will be readily seen that there has been produced such a drain cleaning device as substantially fulfills the objects of the invention, as set forth herein.

I claim:

1. A drain-cleaning device comprising an inverted flexible and resilient cup, a rigid handle secured on and upstanding centrally from the cup, the handle being vertically elongated and tubular, there being a central passage in the cup establishing communication between the bore of the tubular handle and the interior of said cup, and a manually operative shut-off valve mounted on the upper end of the tubular handle; said shut-off valve including a body, a laterally extending threaded neck having a swivel coupling thereon adapted for connection to a flexible garden-type water hose, and a valve control stem extending laterally generally in opposition to said neck whereby such neck and the valve control stem, together with the body, provide an effective hand grip.

References Cited

UNITED STATES PATENTS

| | | | |
|---|---|---|---|
| 672,164 | 4/1901 | Callahan | 239—530 |
| 1,196,414 | 8/1916 | Zimmer | 251—150 |
| 1,361,972 | 12/1920 | Drake | 4—255 |
| 1,937,172 | 11/1933 | Starner et al. | |
| 1,941,065 | 12/1933 | Williamson | 4—256 |
| 2,086,149 | 7/1937 | Allen | 4—256 |
| 2,312,826 | 3/1943 | Leyden | 4—256 |
| 2,697,842 | 12/1954 | Meyer | 4—255 |
| 2,733,450 | 2/1956 | Wallace | 4—256 |

FOREIGN PATENTS

| | | |
|---|---|---|
| 27,115 | 12/1911 | Great Britain. |
| 78,235 | 2/1918 | Switzerland. |
| 260,243 | 7/1949 | Switzerland. |

DANIEL BLUM, Primary Examiner

U.S. Cl. X.R.

134—168